UNITED STATES PATENT OFFICE.

CHAS. PICKERING, OF ST. LOUIS, MISSOURI.

IMPROVED METHOD OF OBTAINING LEAD FROM DROSS.

Specification forming part of Letters Patent No. 59,063, dated October 23, 1866.

*To all whom it may concern:*

Be it known that I, CHARLES PICKERING, of St. Louis, in the county of St. Louis and State of Missouri, have invented a new and Improved Process for Making Lead from Dross and Scummings; and I do hereby declare that the following is a full, clear, and exact description thereof, which will enable those skilled in the art to understand and use the same.

This invention consists in treating dross and scummings made from lead by smelting with sulphur, saltpeter, and asafetida in suitable proportions, in such a manner that the metallic lead contained in said dross and scummings is separated from the impurities mixed therewith, and a large quantity of lead is saved which is otherwise thrown away as waste.

The proportion in which I apply my ingredients is about as follows: sulphur, four table-spoonfuls; saltpeter, three table-spoonfuls; asafetida, two table-spoonfuls for every hundred pounds of dross or scummings.

In carrying out my process, I take a crucible or ladle, cover the bottom with the metal, then put in the ingredients in about the proportion above stated, and fill up with metal. Then put on fire, and let it come to a good red heat, stir well, and pour.

The average cost of material for making the lead will not exceed twenty (20) cents for a hundred-weight of metal.

The process can be carried out in any furnace where the fumes will not escape. I use, by preference, a retort-furnace, though I have made successful experiments in a common crucible, in a brass-molder's furnace, and also with a common plumber's ladle in a stove.

The quantity of metal obtained from dross and scummings treated according to my process is from fifty to ninety per cent. of the gross weight.

What I claim as new, and desire to secure by Letters Patent, is—

The within-described process of treating dross and scummings made from lead by smelting the same together with the ingredients herein specified, for the purpose set forth.

CHAS. PICKERING.

Witnesses:
ANTHONY BOYCE,
ESROM O. PICKERING.